May 6, 1969               M. GROSJEAN               3,442,592
METHOD AND APPARATUS FOR THE MEASUREMENT OF MAGNETIC
CIRCULAR DICHROISM
Filed Aug. 10, 1966
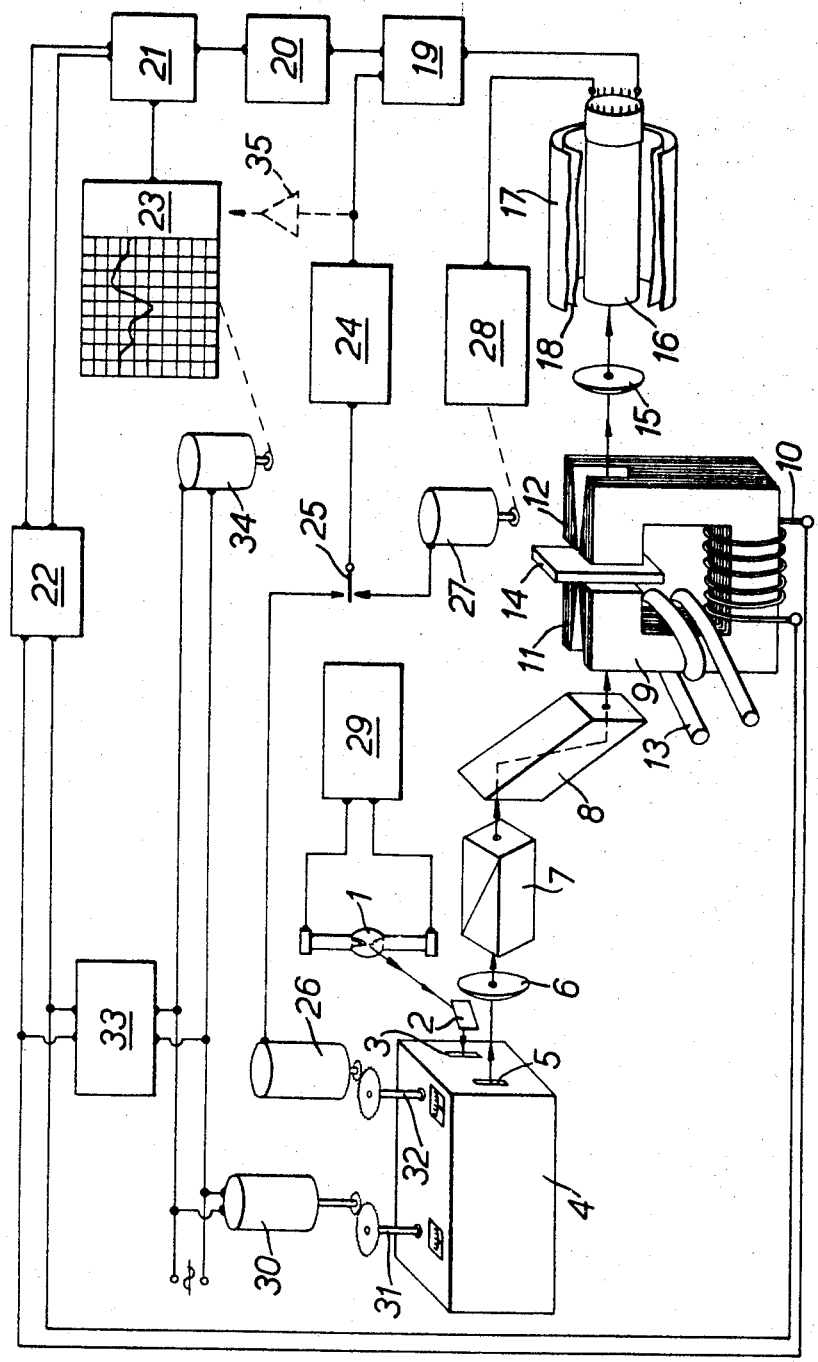
INVENTOR
MARC GROSJEAN
BY
Bacon & Thomas
ATTORNEYS United States Patent Office 3,442,592
Patented May 6, 1969

3,442,592
METHOD AND APPARATUS FOR THE MEASUREMENT OF MAGNETIC CIRCULAR DICHROISM
Marc Grosjean, Paris, France, assignor to Roussel—UCLAF, Paris, France, a French body corporate
Filed Aug. 10, 1966, Ser. No. 571,628
Claims priority, application France, Aug. 13, 1965, 28,307
Int. Cl. G01j 3/04
U.S. Cl. 356—80    14 Claims

ABSTRACT OF THE DISCLOSURE

A method and apparatus for measuring magnetic circular dichroism. A beam from a light source is passed through a monochromator, a polarizer and a quarter-wave plate in order to produce monochromatic light of fixed circular polarization. The beam of fixed circular polarization is then passed through a sample material and through a modulator where it is subjected to an alternating magnetic field oriented parallel to the direction of the beam. The modulated beam is received by a photomultiplier which produces an electrical output proportional to the intensity of the beam. The alternating frequency portion of the signal is detected as representative of the magnetic circular dichroism of the sample substance at that particular frequency of the beam.

---

The present invention concerns a method of and apparatus for measuring the magnetic circular dichroism of a substance exhibiting the phenomenon of magnetic circular dichroism. Every such substance which partly absorbs optical radiation exhibits the phenomenon when optical radiation is passed through it and a magnetic field of an orientation parallel to the direction of the passage of this radiation is applied to the substance. If the substance concerned is by nature optically active, this magnetic circular dichroism is superimposed on and in fact added algebraically to the natural circular dichroism.

Since the magnetic circular dichroism is thus of a magnitude which is variable in proportion to the wave length of the light which passes through the substance, it is the object of the invention to provide a process and an apparatus for carrying it out, which permit a recording of the circular dichroism spectra of substances in a wide range of wave lengths covering the ultraviolet and in the visible spectrum as well as in the infrared spectrum. Since each spectrum thus obtained is characteristic of the composition of the substance studied, its importance is obvious both for the identification of a substance, as well as for the measurement of the concentration of a substance in a given product (the amplitude of the dichroism is connected with the quantity of this substance in the product). The study of the magnetic circular dichroism spectra can be applied to the study of the electronic configurations of atoms and to the study of bonds in the molecules, since configurations and bonds react to the action of magnetic fields.

The value of the magnetic circular dichroism are, however, very low even for high magnetic fields—for example between 10,000 and 50,000 gauss—which can be produced and used industrially. They are of an order of magnitude of a tenth of the values of the natural dichroism which can be readily measured. The sensitivity required for an apparatus for measuring magnetic circular dichroism must be at least $1.10^{-5}$ optical density units.

In order to satisfy this accuracy and also to avoid the additional inconvenience of having to produce two spectra for optically active substances, one with a magnetic field and the other without a magnetic field, of then comparing them and calculating their difference, the invention has as its object a method and apparatus for directly measuring magnetic circular dichroism.

According to the present invention there is provided apparatus for measuring the magnetic circular dichroism of a substance exhibiting the phenomenon of magnetic circular dichroism including, a radiation source, means for converting the radiation therefrom into a monochromatic beam, a polarizer to produce a fixed circular polarization of said monochromatic beam, means for applying to said sample an alternating magnetic field with the lines of force parallel to the beam within said substance, means for converting the intensity of said beam emerging from the substance into a corresponding electrical signal and indicating means controlled by at least the alternating component of said signal for indicating the magnetic circular dichroism at the wavelength of the beam.

Further according to the invention there is provided a method of measuring the magnetic circular dichroism of a substance which partly absorbs optical radiation, including; developing a monochromatic beam of fixed circular polarization, passing said beam through a sample of said substance, applying to said substance an alternating magnetic field with the lines of force in said substance parallel to the direction of the beam, converting the intensity of the beam emerging from the substance into a corresponding electrical signal and deriving from at least the alternating component of said signal information representative of the value of the magnetic circular dichroism of said substance at the wavelength of the beam.

The wavelength of the beam is preferably varied and the magnetic circular dichroism is preferably recorded as a function of the wavelength.

The absorption of a monochromatic light by a substance through which it passes is defined by the general law:

(1) $$\phi = \phi_0 . 10^{-D}$$

in which $\phi$ designates the emerging luminous flux, $\phi_0$ the entering luminous flux and D the optical density or absorbance (expressed to a decimal base). The quantity $10^{-D}$ is commonly denominated "the transmission."

When the substance is subjected to a magnetic field parallel to the path of passage of the light of a value H expressed in gauss, its optical density D does not change in value if the light is not polarised. If in contrast a circular polarized light is used, the optical density becomes:

(2) $$D_d = D_{do} + \mu \cdot H$$

for a right circular light, and (3) $$D_g = D_{go} + \mu \cdot H$$

for a left circular light, equations in which $\mu$ is a coefficient which characterises the magnetic circular dichroism and which depends on the very nature of the substance and the wave length of the monochromatic light concerned, and in which $D_{do}$ and $D_{go}$ are respectively the densities of the right and left circular polarised lights in the obsence of a magnetic field.

For optically active products, i.e. having a natural dichroism, the values of $D_{do}$ and $D_{go}$ differ but for all other substances these two values are equal. The quantity $\mu \cdot H$ is always very small, which makes a direct measurement very difficult per se and necessitates a complex and sensitive apparatus.

When an alternating field is applied with a constant amplitude, for example of the form:

(4) $$H = H_0 \cdot \sin \omega t$$

the optical density, for example $D_d$ (the reasoning and the formulation would be similar, except for the symbol, if a left polarised circular light were used, $D_d$ then being replaced by $D_g$) is varied according to the equation:

(5) $$D_d = D_{do} + \mu \cdot H_0 \cdot \sin \omega t$$

in a manner such that the emerging luminous flux is expressed by the equation:

(6) $$\phi = \phi_0 \cdot 10^{-(D_{do} + \mu \cdot H \cdot \sin \omega t)}$$

carrying the expression $D_d$ given by Equation 5 into Equation 1.

Since the term $\mu \cdot H$ is very small compared with $D_{do}$, it is possible to develop the exponential into a finite series i.e.:

(7) $$10^{-(D_{do} + \mu \cdot H_0 \cdot \sin \omega t)} \approx 10^{-D_{do}} \cdot \left(1 - \frac{\mu \cdot H_0}{\log e} \cdot \sin \omega t\right)$$

with $e$, the base of the Naperian logarithms.

For the measurement, the luminous flux is made to impinge on a receiver which converts it into an electric signal. The voltage of this signal for a receiver of sensitivity $\sigma$ has the form:

(8) $$v = \sigma \cdot \phi_0 \cdot 10^{-D_{do}} \cdot \left(1 - \frac{\mu \cdot H_0}{\log e} \cdot \sin \omega t\right)$$

which has two components, one a direct $v_c$ and the other alternating $v_a$, i.e.:

(9) $$v_c = \sigma \cdot \phi_0 \cdot 10^{-D_{do}}$$

and

(10) $$v_a = -\sigma \cdot \phi_0 \cdot 10^{-D_{do}} \frac{\mu \cdot H_0}{\log e} \cdot \sin \omega t$$

The alternating component can be readily separated from the direct component, by means of a separator which does not allow the latter through then amplified in and amplifier with a very stable gain G and finally detected by a detector synchronous with the frequency of the magnetic field, and thus to the frequency $\omega$. By this treatment there is obtained a detected voltage which is expressed by the equation:

(11) $$V_d = K \cdot G \cdot \sigma \cdot \phi_0 \cdot 10^{-D_{do}} \cdot \frac{\mu \cdot H_0}{\log e}$$

K being a known constant introduced into the detector circuit.

This detected voltage can be positive or negative, dependent on the sign of the quantity $\mu \cdot H_0$, as is obvious, and on the alternating phase which feeds the synchronous detector relative to the phase of variation of the magnetic field applied to the substance to be examined. It is furthermore substantially freed of all interference signals, particularly of the background noise of the receiver, due to the above-said synchronous detection.

In Equation 11 the factors K, G, $H_0$ and log $e$ are constants which are independent of the wave length of the monochromatic light used. The factors $\sigma$ and $\phi_0$, as well as the transmission $10^{-D}$ (in its particular value for a chosen right or left, circular polarised light, as mentioned above) are unknown and variable with the wave length. In order to obtain a sprectrum of the magnetic circular dichroism, the wave length of the monochromatic light is varied over a complete range of these wave lengths, and the variation of the component $V_d$ is simply recorded.

The recorded diagram must thus be interpreted from one point to the other in some form, which is a particularly grave inconvenience, so much more as it is necessary to measure by other means the factors $\sigma$, $\phi_0$ and $10^{-D}$ in this range of wave lengths, whilst the recording can take place in only a few minutes.

However, according to Equation 9 it has been observed that the three factors concerned, the product of which appears in Equation 11, are precisely reproduced at the output of the receiver by the direct component of the electric signals. Two methods are thus offered for making use of this observation which, furthermore, can be combined advantageously with one another in the construction of an apparatus for the direct recording of magnetic circular dichroism.

The first consists of using a ratio recorder and of applying to this recorder the component $V_d$ of Equation 11 and the component $v_c$ of Equation 9 or, at least, a voltage derived from $v_c$, for example by amplifying. In computing the ratio of the second members of these equations, it is quite obvious that the ordinates of the graph supplied by such a recorder (the wave lengths obviously in the abscissa) represent a quantity $K_1 \cdot \mu H_0$, varying as a function of the wave length of the light passing through the sample of the substance to be examined, thus a quantity proportional to the value of the magnetic circular dichroism $\mu$ by factors which are known and at the disposal of the user. $K_1$ is a constant dependent on the proportion of the gains of the amplifiers of the components and of the log $e$-coefficient, and $H_0$ is set by the choice of the user.

The second method consists of maintaining the value of the direct component constant at a predetermined value in the course of exploring the range of wave lengths of the light passing through the sample. This can be done by means of a servomechanism having the said component $v_c$ (preferably after amplifying) as the input variable and having a reference voltage set by the user, the output of this servomechanism being fed to appropriate means for modifying the sensitivity $\sigma$ of the detector and(or) the value of $\phi_0$ for maintaining constant, preferably at zero, the difference between the two input voltages of the said servomechanism in the course of recording the variation of the detected voltage $V_d$.

It should be noted that even when using a ratio recorder it is advantageous to keep the continuous component substantially constant in order to impart a satisfactory damping thereto.

There is thus provided a particularly advantageous method for measuring the magnetic circular dichroism for obtaining spectra of magnetic circular dichroism over large ranges of wave lengths of the monochromatic light, which method consists of applying on each sample of a substance to be examined in this respect, through which a circular polarised monochromatic light passes, a magnetic field extending parallel to the direction of passage of this light across said sample, which magnetic field has an alternating character, and for this reason after the conversion of the luminous ray into an electric signal, this signal comprises an alternating component representing the magnetic circular dichroism, the recording of which, after amplification and synchronous detection at the frequency of the alternating magnetic field supplies a measurement of this dichroism. Since this measurement is affected by the variations of various factors when the wave length of the circular polarised light applied on the sample is varied, this method is completed by maintaining the direct component of the signal constant by means either of a control of the luminous flux applied to the sample and(or) of the sensitivity of the receiver converting the emerging luminous flux of the sample into this electric signal, and(or) by recording the ratio of said synchronously detected alternating component to said direct component.

In order to illustrate the invention in detail, reference will be made to one embodiment by way of example, shown diagrammatically in the single figure of the accompanying drawings.

This embodiment starts with a source of light 1 which, for a study in the ultraviolet and visible spectrum, can consist, for example, of a xenon arc, a hydrogen lamp or a tungsten lamp; for a study in the infrared spectrum, the source can consist for example of a tungsten lamp, a Globar lamp or a Nernst lamp. By means of a mirror 2, the light of this source is directed towards the inlet slit 3 of a monochromator 4. The lamp 1 is preferably fed by a direct voltage originating from a stabilised supply 29 in order to limit as much as possible rapid disturbance fluctuations of the intensity of the light from the source during a measurement (of a duration equal to a few minutes). If those rapid fluctuations were not suppressed, they would produce at the output of the detector additional disturbance signals of the nature of a background noise, which would make it more difficult for the servomechanism to function properly.

In the monochromator 4 and in a manner known per se (therefore not described here in detail) the light from the source is made monochromatic while varying the wave length according to a condition imposed by the control 31. In the example under consideration, there is concerned a condition which is linear in time, the control 31 being simply driven by a motor 30 which is synchronous with the mains supply which feeds it. Simultaneously the paper of the recorder 23 is unrolled under the control of the synchronous motor 34, thus at the same speed and according to the same condition as the variation of the wave length at 4.

The monochromator 4 can consist of a monochromator with a quartz prism or a diffraction grating or else of a double polariser monochromator for the visible and ultraviolet spectrum, and for the infrared spectrum it can consist of a monochromator with a prism of calcium fluoride, sodium chloride or potassium bromide.

The luminous flux emerging through the slit 5, which serves as a monochromatic source for the optical system of the apparatus, has its intensity and its band width adjusted from the control 32 of the slits 3 and 5 when the servomotor 26 rotates in a manner which will be specified later on. The method of adjusting the widths of slits of a monochromator is well known per se.

The beam emerging from the slit 5 is focussed by the lens 6, for example of silica or fused quartz, in the plane of the sample 14 (which can be disposed in a container if it is liquid or gaseous) of the substance to be studied. However, in this path the light is plane polarised by means of a prism 7 which can be a Glazebrook or a Rochon prism for the visible and ultraviolet range, or a polariser with a stack of selenium or silicon plates for the infrared range. It then passes through a quarter wave plate 8, such as a Fresnel prism of fused quartz or calcium fluoride, or a mica plate or monoammonia phosphate plate having a direct electric voltage applied thereto for the visible and ultraviolet range, or for example Fresnel prisms of calcium fluorine or sodium chloride for the infrared range. After two internal reflections in the quarter wave plate 8, the light has a circular polarisation. The respective orientation of this quarter wave plate 8 and of the plane polariser 7 places the plane of polarisation at +45° or −45° to the plane of symmetry of the quarter wave plate 8, from where a right or left, circular polarised light respectively is obtained. Since the use of a right light or of a left circular polarized light finally only involves a change of polarity of the measuring voltage, it is sufficient to orient the polariser once and for all and to take it into account in the interpretation of the results of measurement. Such an arrangement of a common polarizer 7 and a quarter wave plate 8 is known as a "circular polarizer."

The sample 14 is disposed in an air gap of an electromagnet excited by a constant A.C. current in coil 10. The armature of this electro-magnet 9 consists of a stack of magnetic plates in order to eliminate Foucault currents. The pole portions 11 and 12 are machined as shown, to define a passage for the light in a manner such that the magnetic field has an orientation parallel to that of the polarised beam passing through the sample 14. A sinusoidal alternating current originating from the mains supply in the example shown passes through the coil 10, although it could be derived from a stable generator of a different frequency, in particular of a lower frequency, of the order of 5 to 10 cycles per second for using the device in the infrared range. At 33 there is indicated the voltage/stabiliser of the mains supply for maintaining the alternating magnetic field automatically constant. The peak value of this magnetic field can be of the order of 10,000 gauss and for avoiding an undesirable heating which could affect the characteristics of the sample to be studied, the electromagnet can be cooled by an enforced circulation of a cooling liquid in a coil, such as 13, surrounding at least one of the branches of the armature of the electromagnet and possibly surrounding, if necessary, also the other branch of this armature.

The sinusoidal character of the supply is not essential, it is sufficient that this supply is periodic and with a double polarity.

The application of the magnetic field thus modulates the intensity of the transmitted beam, due to the variable absorption of the substance of the sample 14. The beam is focussed by the lens 15 of the same nature as the lens 6, upon a photoelectric receiver shown here in the form of a photomultiplier 16 which responds in the visible and ultraviolet range. For the infrared range a bolometer or a thermocouple can alternatively be used.

Here it may be noted that in place of the lenses 6 and 15 there can be used for the guiding of the luminous flux a conventional system of two concave mirrors working "out of axis," the first reflecting the beam originating from the monochromator onto the element 7, and the second taking up the beam emerging from the sample for reflecting it onto the receiver.

Whatever the nature of the receiver may be, it transforms the variation of intensity of the luminous beam which it receives into an electric signal. In this signal there are present, as has been said, an alternating component with a frequency of the cyclic variation of the magnetic field and a direct component. The alternating component conveys the desired information i.e. the value of the magnetic circular dichroism at the particular monochromatic wave length of the luminous beam.

The receiver 16 must be protected against the effects of the alternating magnetic field. Besides the spacing due to the insertion of the focussing lens 15 (or of the above-mentioned miorror), it is preferable to provide an anti-magnetic shield around the detector, for example in the embodiment shown, two such shields 17 and 18, for example of Mu Metal, are shown around the photomultiplier 16.

The high voltage of the photomultiplier is regulated by an adjustable supply 28, the contingent control of which will be described later on.

The electric signal produced by the photomultiplier 16 is amplified in the first place by a preamplifier-separator 19 provided to present a substantially uniform gain and its components appear separated at the outputs of this amplifier. The alternating component is fed to a stabilised A.C. amplifier with a high gain G, indicated at 20, and the output of this amplifier is fed to a synchronous detector 21, the synchronisation of which is ensured by the same voltage as that of the excitment coil 10 of the electromagnet across, however, an adjustable phase changing circuit 22. In fact, the alternating signal emerging from the amplifier 20 is substantially in phase with the magnetic field of the electromagnet, thus with the current which passes through the coil 10, but this coil has a highly reactive impedance, hence the phase shift of the magnetic field on the feed voltage. The use of a synchronous detector which, by the way, can be of any type well known in the art, substantially ensures the elimination of the effects of the background noise of the receiver 16. The detector 21 and(or) the amplifier 20 which preceds it preferably incorporate furthermore filter circuits in such a manner that the rectified alternating signal has an amplitude which follows faithfully the variations of the desired information in the alternating component originating from 16.

The output of the detector 21 is connected to the control input of a conventional recording means 23, the recording paper support of which is driven, as mentioned above, by a motor 34 synchronised with the control drive for the variation of the wave lengths of the light in the monochromator.

The accuracy of the recording thus effected obviously supposes that the recording means of the recorder is controlled only as a function of the variations of absorption by the sample 14 due to the magnetic circular dichroism. However, when the magnetic dichroism is investigated over a spectrum of wave lengths of the light, it is quite evident that the intrinsic absorption varies in dependence upon the wave length. It is furthermore evident that the receiver does not respond uniformly to every wave length of the light. It is therefore convenient to introduce an automatic correction of these factors or, more precisely, as is shown by the above analysis, of their product. This correction is derived from the direct component of the signal originating from the receiver 16, which is tapped at the output of the amplifier 19 to form at 24 an error signal equal to the difference between its variable value and a fixed reference value, which is amplified differentially by the amplifier 24. The error signal thus formed is applied either to the servomotor 26 to control the intensity of the luminous flux originating from the imaginary "source" 5 of the optical system to compensate for the variations of absorption of the sample (and possibly of the optical system itself) in the varying values of wave lengths of the light, plus the variations of sensitivity of the response of the receiver in the spectrum explored, or to control the high voltage of the dynodes of the multiplier by means of a servomotor 27 operating, for example, a regulating potentiometer for the stabilised supply 28. A manual switch is indicated at 25 which allows the operator to choose the most advantageous of these correction systems, whilst leaving to him the full additional possibility to take recourse to the other system in the course of operation, if necessary.

Here it should be noted that in the diagram all electric connections have been shown monofilary, which presupposes an earth return (not shown).

Another manner for eliminating the inaccuracy due to the responses, which are variable dependent on the wave length of the light, of the sample and the optical system, and the photoelectric detector can consist of controlling the recording means, no longer directly from the detected component originating from 21, but from a signal obtained by determining the ratio of this component to the direct component originating from the amplifier 19, which is indicated by the connection 35 shown in dashed lines, which may be amplified. Considering, for example, that the recorder is of the well known type with a potentiometer wire, the slide of this wire is normally driven at the same time as the recording means and the voltage tapped by the slide is fed back for comparison with the voltage originating from 21 for the control of a servomotor driving this slide and this recording means. For converting this recorder into a ratio recorder, it is sufficient to substitute for the previously fixed reference voltage applied to the terminals of the potentiometer wire the voltage of the direct component originating from 19 and conducted by the connection 35, as a result of which the recording servomechanism will act as an analogue divider, thus ensuring the recording of the ratio $V_d/V_c$.

In this last case, the use of a ratio recorder, it could seem unnecessary to maintain a correction of the intensity of luminous flux and (or) the sensitivity of the receiver. In fact this may well be the case but in practice it will be advantageous to maintain the continuous component substantially constant in order to alleviate the stresses which bear upon the recorder itself and the electronic circuits preceding it. The above said corrections can thus be maintained advantageously, although with a lower degree of accuracy, in order to impart to the recorder a constant damping regardless of the conditions of measuring.

For the recorder concerned, there could be substituted a cathode ray tube, the oscillograph screen of which may be photographed. In this case the horizontal time base of the tube would be controlled by a voltage adapted to the position of the synchronous motor 34 and the reference level of vertical exploration would be adapted to the variation of the direct voltage at the output of the amplifier 19.

It can here be noted that a part of the above-described combination of elements used in the apparatus taken as an example, has already been described in our British patent specification 979,712 "Apparatus for Measuring Circular Dichroism of Optically Active Substances," and in the application for a patent of addition thereto No. 3,854/65 (specification No. 1,089,953).

However, there must be pointed out the fundamental difference of the very concept of the method of measuring the natural dichroism of optically active substances, the object of the patent and of the patent of addition referred to above and of the present method of measuring the magnetic circular dichroism. For the natural dichroism, there was concerned fundamentally the forming of a signal which is characteristic for the difference of absorptions between a right circular polarisation and a left circular polarisation of the light passing through the substance to be studied. In the method proposed by the present invention for measuring the magnetic circular dichroism, the polarisation of the light must, in contrast, be maintained constant to avoid a superimposition of the two effects in the case of optically active substances, whilst in contrast the modulation imparted to the magnetic field is provided for producing an alternating signal which is directly usable for the purposes of measurement and recording.

I claim:

1. Apparatus for measuring the magnetic circular dichroism of a substance exhibiting the phenomenon of magnetic circular dichroism including a radiation source, means for converting the radiation therefrom into a monochromatic beam, a polarizer to produce a fixed circular polarization of said monochromatic beam, means for applying to said sample an alternating magnetic field with the lines of force parallel to the beam within said substance, means for converting the intensity of said beam emerging from the substance into a corresponding electrical signal and indicating means controlled by at least the alternating component of said signal for indicating the magnetic circular dichroism at the wavelength of the beam.

2. Apparatus as claimed in claim 1 in which the means for applying an alternating magnetic field is an electromagnet having a passage therethrough disposed so that said beam can be passed through a substance disposed between the poles of the electromagnet.

3. Apparatus as claimed in claim 1 including means for varying the wavelength of said beam and wherein said indicating means records the magnetic circular dichroism as a function of the wavelength.

4. Apparatus as claimed in claim 1 including means for separating the alternating component from the direct component of said signal, means for amplifying said alternating component, and means for synchronously detecting the alternating component at the frequency of the current in the electromagnet.

5. Apparatus as claimed in claim 4 in which the means for converting the radiation into a monochromatic beam is a monochromator including slits actuated by a servomechanism controlled by said direct component whereby the direct component is kept substantially constant.

6. Apparatus as claimed in claim 4 in which the means for converting the intensity of said beam into an electrical signal is a photomultiplier controlled by said direct component whereby the direct component is kept substantially constant.

7. Apparatus as claimed in claim 6 in which a switch is provided for feeding said direct component either to actuate said slits or to control said photomultiplier.

8. Apparatus as claimed in claim 7 including means for recording the ratio of said synchronously detected alternating component and said direct component.

9. A method of measuring the magnetic circular dichroism of a substance which partly absorbs optical radiation, including developing a monochromatic beam of fixed circular polarization, passing said beam through a sample of said substance, applying to said substance an alternating magnetic field with the lines of force in said substance parallel to the direction of the beam, converting the intensity of the beam emerging from the substance into a corresponding electrical signal and deriving from at least the alternating components of said signal information representative of the value of the magnetic circular dichroism of said substance at the wavelength of the beam.

10. A method as claimed in claim 9 in which the wavelength of said beam is varied and the magnetic circular dichroism is recorded as a function of the wavelength.

11. A method as claimed in claim 10 in which said alternating component is separated from the direct component of said signal, said alternating component being amplified and subsequently synchronously detected at the frequency of the current producing said magnetic field.

12. A method as claimed in claim 11 in which said direct component controls the intensity of the monochromatic beam whereby said direct component is maintained substantially constant.

13. A method as claimed in claim 11 in which said direct component is fed to control a photomultiplier which converts said emerging beam into an electrical signal whereby said direct component is maintained substantially constant.

14. A method as claimed in claim 13 in which the ratio of said synchronously detected alternating component and said continuous component is recorded.

References Cited

UNITED STATES PATENTS

| | | | |
|---|---|---|---|
| 2,973,684 | 3/1961 | Nisle | 250—225 |
| 3,157,727 | 11/1964 | Hardy et al. | 88—14 |
| 3,164,662 | 1/1965 | Grosjean et al. | 88—14 |
| 3,284,632 | 11/1966 | Niblack et al. | 250—225 |
| 3,312,141 | 4/1967 | Cary | 88—14 |

J. W. LAWRENCE, *Primary Examiner.*

D. O. REILLY, *Assistant Examiner.*

U.S. Cl. X.R.

356—114; 250—218, 225